July 3, 1934.  E. V. J. TOWER  1,965,325
FRICTION CLUTCH
Filed March 26, 1929  4 Sheets-Sheet 2
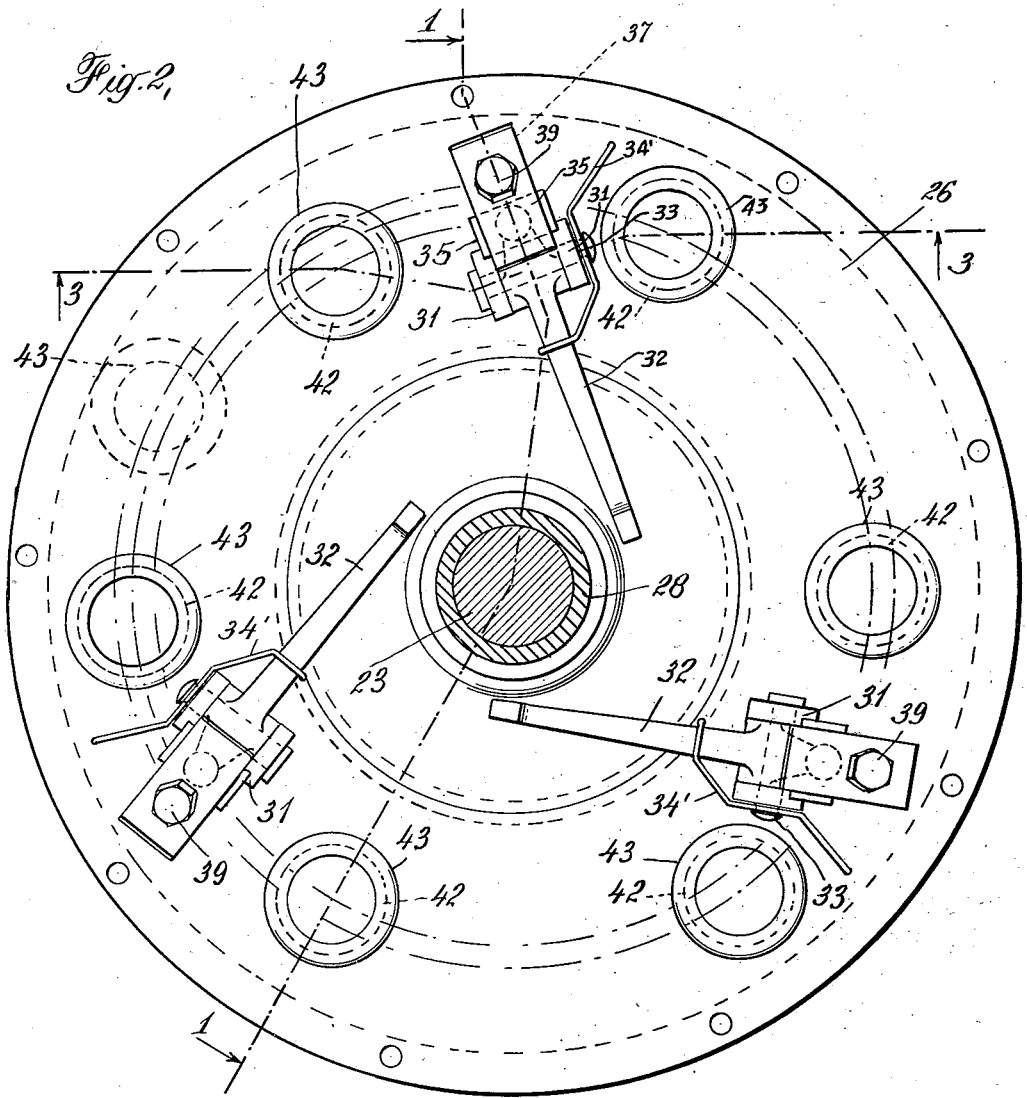
Fig. 2,
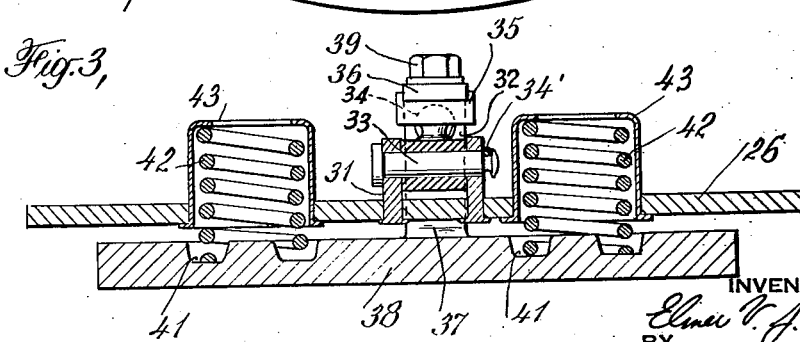
Fig. 3,
INVENTOR
Elmer V. J. Tower
BY
ATTORNEYS July 3, 1934.  E. V. J. TOWER  1,965,325
FRICTION CLUTCH
Filed March 26, 1929   4 Sheets-Sheet 3
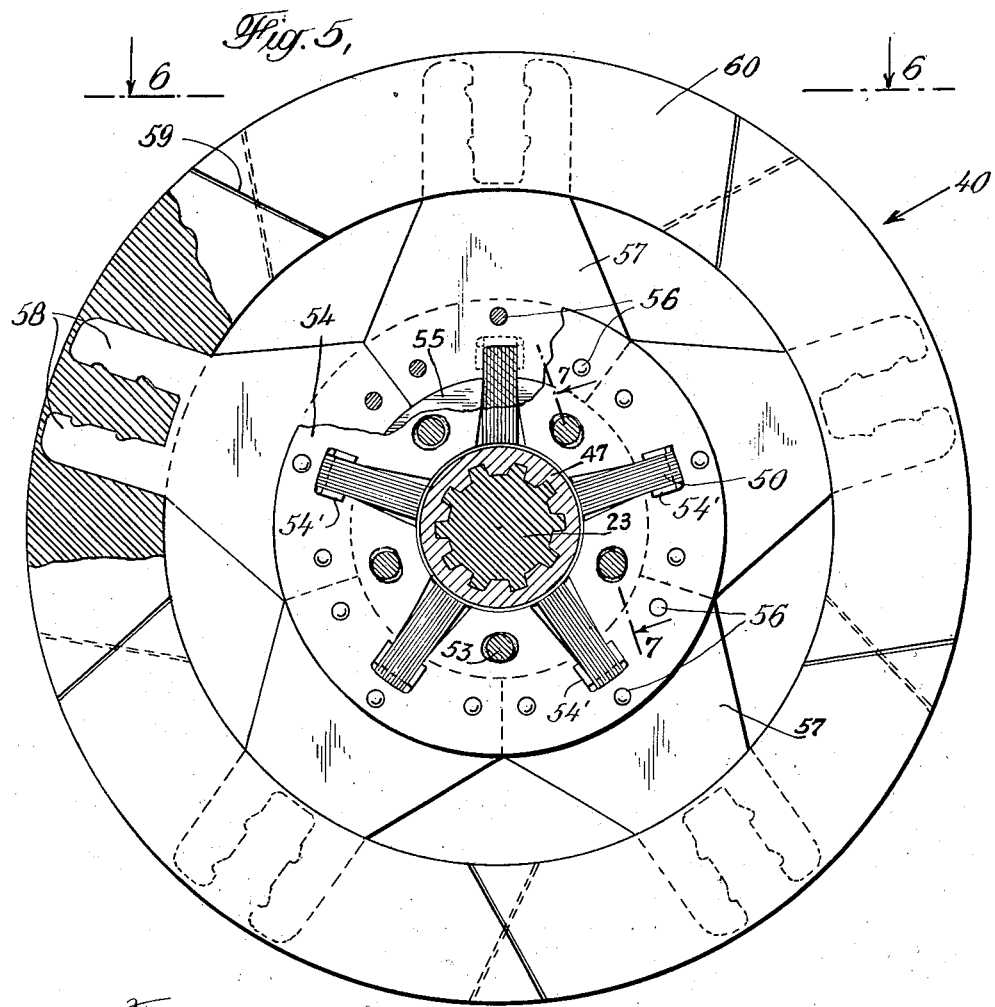
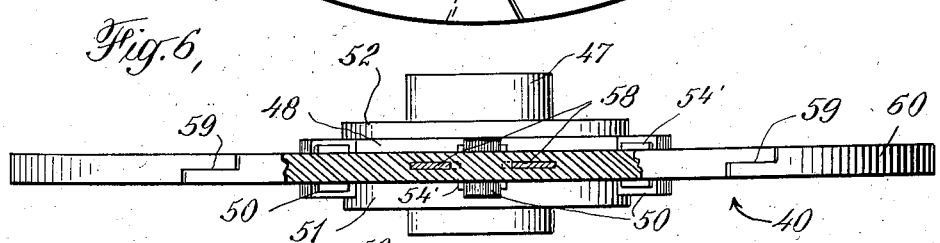
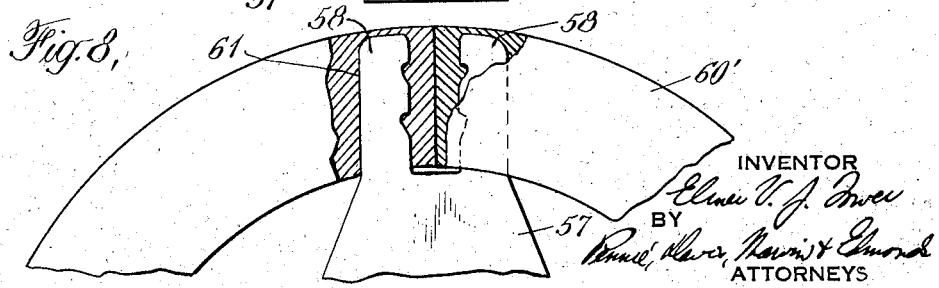
INVENTOR
BY
ATTORNEYS

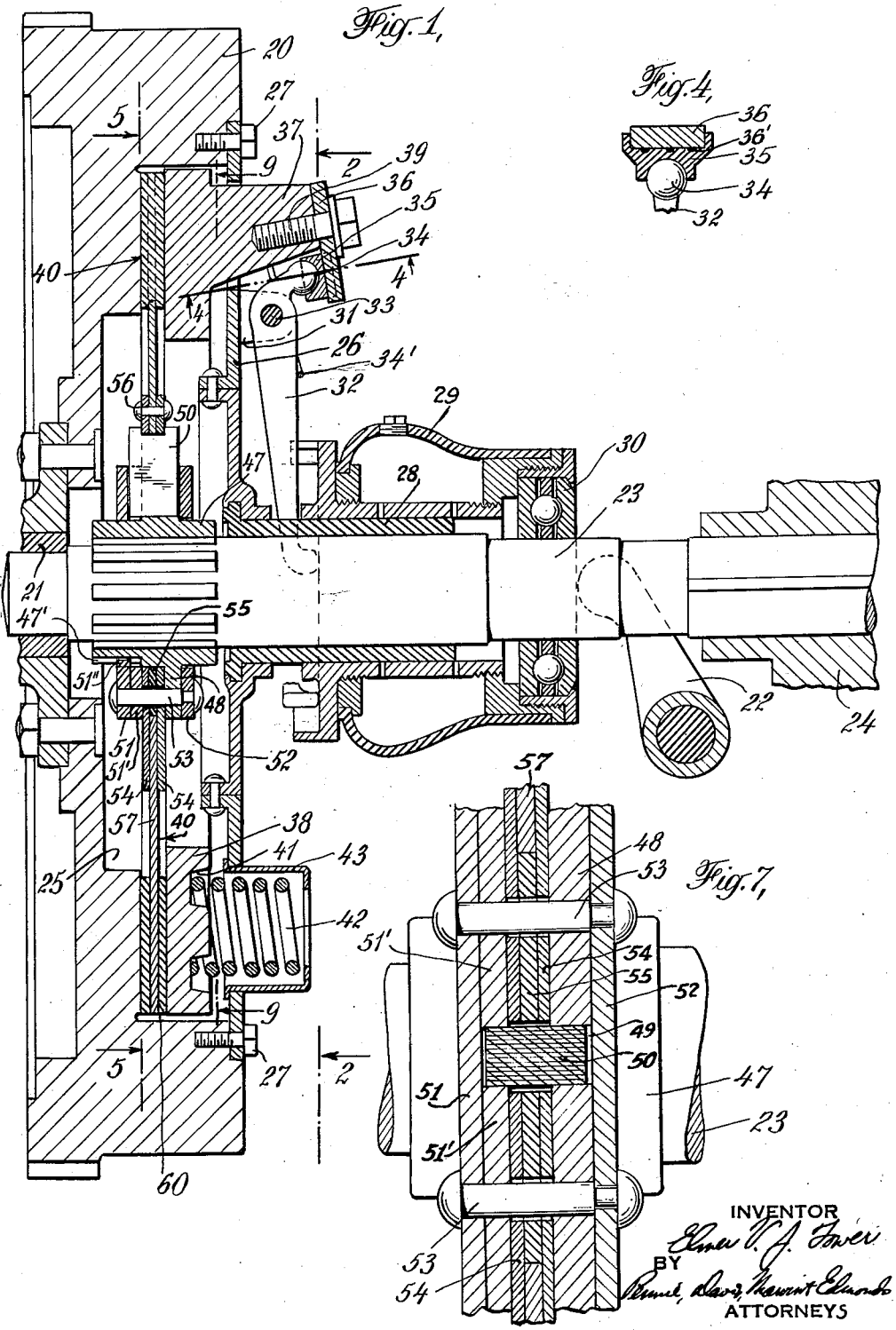

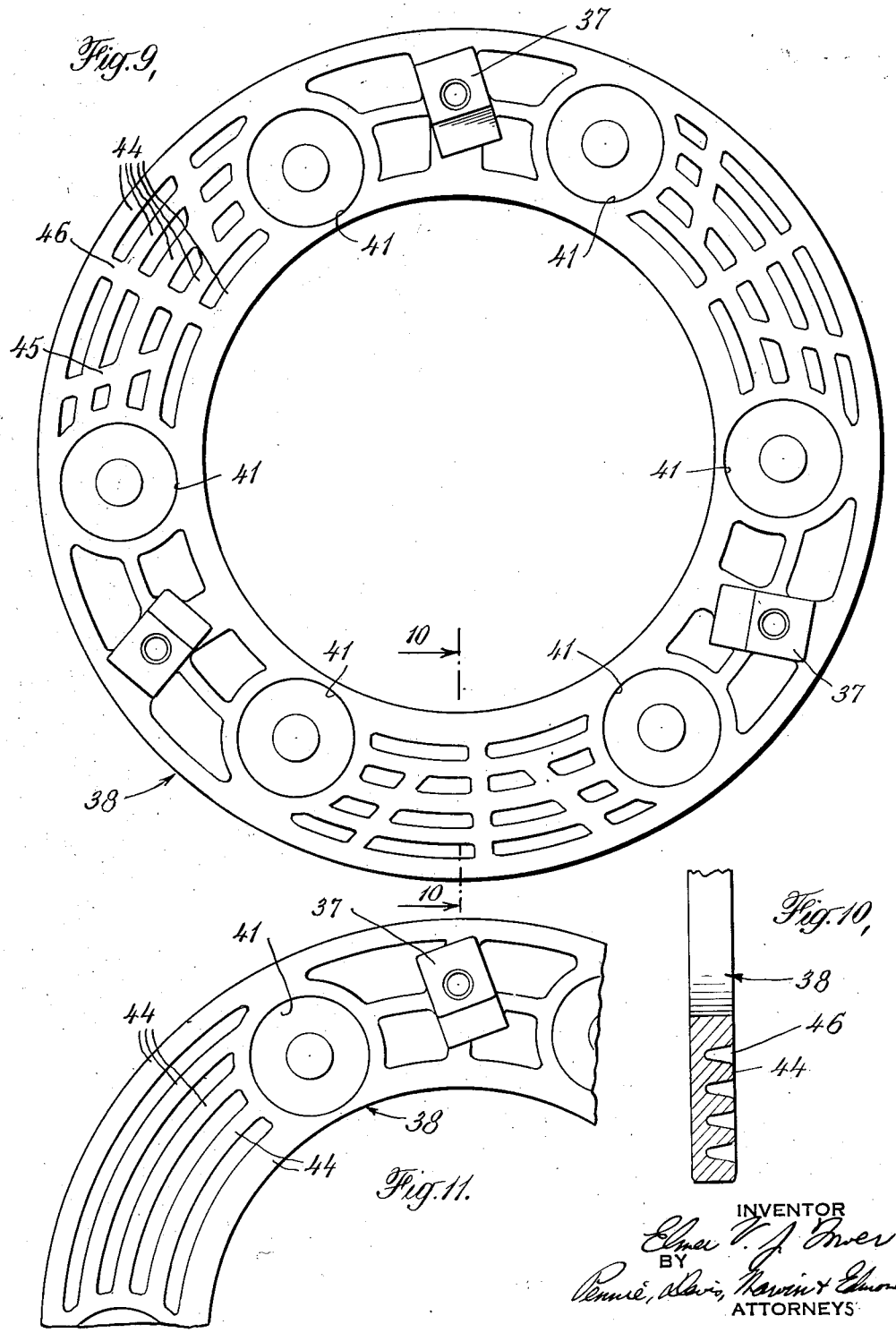

Patented July 3, 1934

1,965,325

UNITED STATES PATENT OFFICE 1,965,325

FRICTION CLUTCH

Elmer V. J. Tower, North Syracuse, N. Y., assignor, by mesne assignments, to Automotive Patents Corporation, New York, N. Y., a corporation of Delaware Application March 26, 1929, Serial No. 349,933

15 Claims. (Cl. 192—68)

This invention relates to clutches used to connect a driver element to a driven element for the transmission of power, and has particular reference to friction clutches employed in automobiles and other motor driven vehicles.

Clutches for the purpose described are subjected to severe strains and shocks during operation of the automobile or the like, and consequently automobile clutches have heretofore commonly been made large, rigid and heavy in order to withstand these strains and shocks and to operate satisfactorily without undue slipping or seizing and be capable of use for long periods without requiring repair or replacement of parts. While these precautions in general have secured fairly satisfactory operation, the prior clutches are expensive because of the large masses of materials, extensive machining work, and aligning and balancing operations necessary because of the heavy masses and many parts. In addition to these objections, the heavy masses which the operator of the automobile was required to move by manipulation of the clutch pedal made operation of the automobile tiring, especially when frequent shifting of gears was necessary, as when driving in traffic. Furthermore, clutches used heretofore were directly assembled with parts of the driving mechanism and could not be removed and replaced as a whole without disassembling either the clutch or adjacent parts of the automobile driving mechanism or both.

The present invention has for its object the provision of a friction clutch, adapted especially for automobiles and other motor driven vehicles, in which the enumerated objections to existing clutches adapted for the same purpose are eliminated and improved operation is provided. The new clutch is a complete self-contained unit which can be readily installed and removed while maintaining the necessary alignment of its parts at all times, and has a long life, is of light weight although providing a positive and powerful drive, includes a transmitting element provided with a vibration dampener whereby shocks and motor vibrations are absorbed and smooth operation of the clutch provided.

In the new clutch all of the elements are assembled in a unit which may be installed in and removed from an automobile without great labor or special skill. Among the clutch parts are flexible and resilient devices which absorb shocks and strains, dampen vibrations, facilitate clutching and declutching by preventing chattering and seizing, and automatically compensate for wear and manufacturing differences whereby manufacturing costs can be greatly decreased because accurate and extensive machining of the parts is not necessary. The various clutch parts are of relatively light weight so that strains and shocks arising from the momentum and inertia of the moving parts is reduced, and means are provided by which the spring pressure may be applied evenly so that the clutch operates smoothly. In addition, the pressure plate is so constructed that distortion due to heat is largely avoided even under severe operating conditions and this also contributes to the smooth operation of the clutch and reduces wear. A novel operating lever arrangement is provided whereby the force applied by the operator to release the clutch spring pressure to disengage the clutch automatically becomes of increased effectiveness without requiring increased force, and conversely, when the clutch springs are released in order to effect the engagement of the clutch their pressure automatically becomes of decreased effectiveness as the levers perform their function. Thus, the clutch operates smoothly without chattering and seizing so as to obtain full effectiveness of the pedal force applied to the levers in disengaging the clutch and of the spring pressure to engage the clutch when the manual force is released from the levers. Other advantages of the new clutch will be apparent to those skilled in the art upon consideration of the following description of one embodiment of the invention illustrated in the accompanying drawings, in which Figure 1 is a cross-section of the new clutch taken along the line 1—1 of Fig. 2, and illustrates the amidships type of clutch, but it is obvious that the unit type of clutch may also embody the invention;

Fig. 2 is a face view of the clutch with the release collar removed;

Fig. 3 is a cross-section thereof as seen along the line 3—3 of Fig. 2;

Fig. 4 is a cross-section of a portion of the release lever mechanism taken along the line 4—4 of Fig. 1;

Fig. 5 is a face view of the transmission element including vibration dampening means with one of the retaining rings removed for clarity, as seen along line 5—5 of Fig. 1;

Fig. 6 is an edge view thereof shown in partial section as seen along the line 6—6 of Fig. 5;

Fig. 7 is a fragmentary cross-section of the vibration dampening means of the transmission element as seen along the line 7—7 of Fig. 5;

Fig. 8 illustrates a modified form of the friction ring mounted on the spider of the transmission element;

Fig. 9 is a face view of the presser plate as seen along the line 9—9 of Fig. 1;

Fig. 10 is a cross-section thereof taken along the line 10—10 of Fig. 9; and

Fig. 11 is a fragmentary view of the face of a modified form of presser plate.

Referring especially to Fig. 1 of these drawings, numeral 20 designates the fly-wheel of an automobile engine or the like, which is fitted with a bushing 21 for the reception of the forward end of short shaft 23, the rear end of which is fitted with one of the gears 24 of the transmission mechanism, not shown. Fly-wheel 20 is formed with a recess 25 in which a portion of the clutch mechanism is enclosed by master plate 26 secured to the fly-wheel by tap screws 27. In the amidships type of clutch shown in Fig. 1, the web of master plate 26 is fitted with a bushing 28 journalled on shaft 23 on which the clutch release collar 29 is slidably mounted. This release collar is provided with an oil reservoir and is fitted with a ball thrust bearing 30 which is engaged by release yoke 22 connected so as to be operated by the usual clutch pedal, not shown.

The master plate 26 is preferably made of thin sheet metal so as to be rigid but relatively light in weight, and is provided with as many sets of parallel lugs 31 as there are clutch release levers. In the form shown in Figs. 2 and 3, three sets of these lugs 31 form yokes for three release levers 32 which are journalled on pins 33 passing through lugs 31 and held in place by wire keepers 34' fitting into grooves on the ends of pins 33 and engaging the tops of levers 32 and the surface of master plate 26 at opposite ends. Obviously other arrangements for keeping pins 33 in place may be used whereby the necessity of drilling for cotter pins or the provision of threaded parts may be obviated.

The release levers which function to move the presser plate free from the clutch transmitting element against the action of springs normally holding the clutch engaged are of the bell crank type with the pivot pin for each lever at the angle thereof and the short lever arm turning sharply away from the long lever arm adjacent the pivot. The end of the short arm bears against the surface of a member rigidly connected to the presser plate, and I prefer to form the end of the short arm of the lever as a ball which fits in a suitable socket in a slide member 35 mounted to slide on a plate 36 secured on the end of a stud 37 preferably formed integrally with the presser plate 38. The plate 36 is secured to the end of the stud by a tap screw 39 and the surface of the member 35 which contacts with the plate 36 is preferably formed with oil pockets 36' for lubrication.

In the clutch construction disclosed, the presser plate is normally forced against the transmitting element by means of springs later to be described, and the clutch is, therefore, normally in engagement. In order to disengage the clutch, the operator depresses the usual clutch pedal, moving the release collar against the ends of the long arms of the levers. The levers are rocked in a clockwise direction and in their movement, they move the presser plate away from the transmitting element against the action of the springs. Since each lever has a long arm and a short arm which are substantially at right angles to one another and the short arm normally extends toward the surface of plate 36 but at an angle thereto, it will be apparent that in the disengaging or clockwise movement of the lever, the short arm will in effect become shorter while the effective length of the long arm remains substantially the same. This change in the effective length of the lever arms increases the lever arm ratio and the lever in effect becomes more powerful as the disengaging movement proceeds. This is a desirable feature since as the presser plate is moved away from the transmission element, the springs acting on the presser plate become more and more compressed and without the increase in effectiveness of the levers, the operator would have to apply an increasing force to disengage the clutch.

When the clutch is let in, that is, when the presser plate is allowed to engage the transmitting element, it is desirable that the last portion of the movement of the presser plate which effects engagement should be slow and gradual so that the clutch will operate smoothly. However, when the levers move counter-clockwise, the change in position of the short arms has the same effect as if those arms were lengthened. This reduces the effectiveness of each lever and the reduction in effectiveness increases the speed of movement of the presser plate and the presser plate tends to move with its greatest speed near the end of its movement toward the transmission element. If nothing were done to counteract this method of functioning of the levers, the levers would have the desired feature of becoming more effective as the spring pressure builds up during the declutching operation, but the undesirable feature of becoming less effective and thus producing a greater movement of the presser plate in that portion of the movement of the presser plate when it is just about to contact with the disc. Such a clutch would be easily operated without increasing effort by the driver of the vehicle as the disengagement proceeds but would be likely to seize and grab as it was let in.

In order to overcome the difficulties above-mentioned, I have mounted the slider plate 36 in inclined position relative to the direction of presser plate movement or to a plane through the pivot points of the levers. Each slider plate is so disposed as to be substantially tangent to the arc of movement of the end of the short arm of its lever and the plate is positioned so that that portion against which the short end of the lever acts at the end of its movement for clutching and the beginning of its movement for declutching is nearer the plane through the pivot points than the portion of the slider plate against which the end of the short arm of the lever bears at the end of its declutching and the beginning of its clutching movement. With this disposition of the plate, the total movement of the presser plate is decreased; that is, it is less than would be the case if the surface against which the end of the short arm of the lever bears were parallel to a plane normal to the direction of presser plate movement or through the lever pivot points. The inclination of the slider plates in the manner described tends to counteract the seizing and grabbing action which might result due to the increased speed of the presser plate permitted by the levers at or near engagement as a result of the variation in the lever ratio. While this inclination of the plate to some extent reduces the effectiveness of the increase in lever ratio near the end of a declutching operation, this is not a matter of importance because in disengaging a clutch, the operator ordinarily forces the clutch pedal to the floor of the vehicle rapidly in a single movement and any counteracting of the increased effect of the levers near the extreme end of their disengaging movement merely increases the pedal pressure necessary to a slight degree.

The studs 37 are rectangular in shape, as shown in Fig. 2, and pass with a sliding fit through correspondingly shaped slots in the master plate 26. It is preferred that these slots in the master plate be made slightly longer than the studs as shown in Fig. 1, in order that only the two opposite long surfaces of studs 37 need be machined. These surfaces are thus the only surfaces which engage the master plate and they take the driving pressure thereof since they face the direction of rotation of the fly-wheel 20 in which master plate 26 is mounted. These flat driving surfaces of studs 37 present comparatively large areas over which the driving pressure is distributed and consequently are not subject to uneven wear with consequent looseness as is the case when the usual circular studs are employed.

The studs are angularly disposed around the master plate but the long transverse axis of each stud is inclined to a radius. This insures that the studs will act to center the parts because the angularity of their flat surfaces prevents any tendency of the presser plate to move radially by any centrifugal action by reason of inexact balancing. Furthermore, the angularity of the studs keeps the presser plate centered and prevents distortion and rattling, even though the slots in the master plate become worn.

The presser plate 38 is preferably made of cast metal and is provided with the usual plane surface which engages with the transmission element 40 cooperating with a corresponding plane surface on fly-wheel 20 and splined on shaft 23. The presser plate 38 is shown particularly in Figs. 1, 9 and 10 and is so formed as to be immune against temporary or permanent distortion caused by frictional heat developed in the clutch. This requires unusual rigidity of the presser plate, and in order to obtain it without excess weight a novel system of ribbing is employed. Certain definite areas of the presser plate surface are occupied by the studs 37 and the sockets 41 for the clutch springs 42, which are seated at their opposite ends in spring cups 43 projecting upwardly from the outer face of master plate 26 as shown in Figs. 1 and 3. The spring sockets 41 are preferably disposed at either side of each stud 37 and may all be of the same depth or of varying depths to obtain successive and consequently gradual action of the several springs of the same length. Obviously other ways of obtaining this gradual spring action, such as making the springs of various strengths and the like, may be employed.

Between the studs 37 and the spring sockets 41 and between adjacent sockets 41 are provided a series of concentric ribs 44 traversed by a series of cross ribs which are preferably arranged at angles to each other, the diagonal ribs 45 making a substantial angle, such as 45°, with respect to the radial ribs 46. These ribs may be arranged in any desired way with respect to each other, and secure to the presser plate immunity to distortion caused by frictional heat which has a tendency to cause the presser plate to curl at its edges and retain this distortion when cool. This distortion tendency under frictional heat may be further prevented by arranging the springs 42 at varying radial positions as shown particularly in Figs. 2 and 9, where alternate springs are arranged at a greater radial distance than the remaining springs, and vice versa. In this way the distortion in a radial direction is prevented by the evenly distributed spring pressure, and at the same time a more uniform spring pressure may be obtained. By this arrangement of springs the desired rigidity of the presser plate and immunity against heat distortion may be obtained without the extensive ribbing shown in Fig. 9 or with only part of it, namely the concentric ribbing as shown in Fig. 11, which is especially adapted for small clutches. Similarly, the ribbing alone will be sufficient in certain instances without the novel spring arrangement described. As is further shown in Figs. 9 and 11, the rigidity secured by the ribbing may be augmented by the arrangement of the spring cups 41 and the studs 37 which are also formed to include the integral ribs shown.

The transmission element 40 of the clutch includes means for dampening torsional vibration generated in the motor and absorbing shocks and jars incident to operation. This element comprises a hub, the usual disc carrying friction material, and means connecting the hub and disc which permits a limited degree of relative angular movement between the hub and disc. In the construction illustrated, the hub is provided with a flange to which the disc is connected by rivets or the like which pass through elongated openings in the disc and the flange has radial recesses or pockets in which are seated bundles of leaf springs which project radially of the pockets and have their outer ends seated in notches in the disc. The leaf springs of the individual bundles are flexible in the plane of rotation of the disc and they extend beyond the plane of that portion of the disc adjacent to the springs. The disc bears against the outer leaves of each bundle between the side edges thereof and as forces are applied to the disc or hub which tend to produce a relative angular movement between these parts, such movement is resisted by the springs which are allowed to flex under load by the formation of the walls of the pockets in the flange and disc. As a consequence, periodic vibration generated in the motor results in flexing of the spring bundles and is not transmitted through these bundles to the hub so that the driving shaft of the vehicle may be maintained under load at all times even when the load is not smoothly applied to the disc.

In the construction illustrated in the drawings, the hub 47 is provided with internal splines and is thereby secured with a driving engagement to shaft 23 on which the hub is mounted. The hub is provided with an external circumferential flange 48 with radial slots 49 in which are seated the ends of the bundles of leaf springs 50. In the construction illustrated, there are five such bundles but a greater or less number of bundles may be used as required.

The bundles project both radially and laterally out of the slots 49. Mounted on the hub which projects through a central opening in the disc is a ring 51 which has recesses to receive the portions of the spring bundles which project laterally out of the slots 49. Preferably the ring is provided with sector members 51', spot welded, riveted or otherwise secured to one surface of ring 51 at the desired spacing. The ring 51 is secured to the hub in any convenient manner as by means of a key 51" formed in the inner edge of the ring 51 and received in a short keyway 47' in the outer surface of the hub (Fig. 1). Ring 51 is freely movable axially along the hub but is held against rotation thereon. The ring 51 prevents displacement of the spring bundles laterally from the slots or pockets 49 in one direction and the bundles are held against displacement laterally in the opposite direction by a ring 52 which lies against the outer face of flange 48.

The disc is secured in place between flange 48 and blocks 51' on ring 51 by shoulder rivets 53 which pass through the ring and flange and also through elongated openings in the disc. These rivets maintain the ring and flange at the proper spacing and by reason of the elongated openings in the disc, the disc is free to move angularly relative to the hub to a limited degree.

In the construction illustrated, the disc is a fabricated structure including a plurality of spokes, the hub ends of which are held between laterally flexible washers or rings 54. These rings project inwardly beyond the inner ends of the spokes and define the central opening in the disc through which the hub extends, the rings terminating close to the surface of the hub. In the space between the rings and hub and inwardly from the hub ends of the spokes is a ring 55 of heat-insulating material against which the hub ends of the spokes bear. This disc is made of fibre or other suitable heat-insulating material and elongated openings are formed in the ring 55 as well as in rings 54.

The spokes 57 are shaped at their hub ends so that their edges abut each other and together form a complete circle, whereby the spoke structure in itself is made rigid in the plane of rotation. The hub end of each spoke 57 is notched for the reception of the outer end of a spring bundle 50, as shown in Figs. 1 and 5. In order to accommodate the spring bundles 50, the heat-insulating disc 55 and flexible washers 54 are slotted radially, these slots flaring toward the hub 47, as shown in Fig. 5, this flaring being arranged to allow for the flexing of the spring bundles 50 in the plane of rotation as the spider 54—55—57 of transmission element 40 moves relatively to its hub 47 in the plane of its rotation. A bearing for the outer ends of spring bundles 50 may be provided, if desired, on washers 54 by rolling the edges of their radial slots to form beads 54', as shown in Figs. 1 and 5.

The relative movement allowed between spider 54—55—57 and its hub 47 by the flexure of spring bundles 50 dampens any vibration in the plane of rotation which may be set up in the clutch because of torsional vibration generated by the motor at critical speeds and also due to faulty manipulation of the clutch. The individual spoke structure is also flexible as a whole at an angle to the plane of rotation because of the lateral flexibility of spokes 57 and washers 54, whereby the sudden shocks of clutching and declutching are absorbed or dampened out by lateral flexing of the spoke structure.

The disc of the transmitting element by reason of the spoke structure disclosed is discontinuous and mounted on the disc at the rim is friction material of the usual construction.

In one modification of the transmission element 40 the friction ring 60 is made of fibre moulded on the ends of the spokes 57 and, in order to obtain a rigid and secure joint, the spokes 57 are bifurcated at 58 as shown in Figs. 5 and 6, and the bifurcation is serrated to insure most secure adhesion of the fibre to the spoke ends without metallic connecting means. The friction ring 60 is not made continuous in the modification shown in Figs. 5 and 6, but is formed into sectors, one on each spoke, the ends of which engage each other by means of a diagonal end lap joint 59, whereby the adjacent ends of each sector are allowed to spread slightly and the whole ring 60 to bend at these points in response to lateral flexing or turning of the spokes 57 and so as to allow for inequalities in the surfaces of the fly-wheel and presser plate and by their yielding qualities cause a more gradual clutching and declutching engagement. The end lap joints 59 of ring 60 are so arranged that a dove-tailing effect is procured in that the ends of the adjacent sectors both overlap and underlap each other, whereby the joints 59, though slightly yieldable in both directions, cannot spread materially. This flexibility of ring 60 is consistent with the flexibility of the spider 54—55—57 and does not in any way limit or prevent the flexing of the latter. It is preferred that a suitable lubricant or anti-friction material be inserted in or applied to the engaging surfaces of the end lap joints 59 of friction ring 60 to facilitate their flexibility and prevent sticking.

In Fig. 8 is shown a second modification of the friction ring mounting which is preferred in some instances, and in which the ring 60' is not divided into sectors but is made substantially continuous of woven friction fabric such as asbestos or the like. Spaced pairs of pockets 61 are woven in the fabric, preferably by separating the warp threads at this point in weaving a multi-ply strip which is subsequently severed into the proper lengths for formation into the friction ring 60', this severing being done between adjacent pockets of one of the spaced pairs of pockets. Accordingly, each strip which is to be formed into the friction ring 60' has a single pocket close to each end thereof in addition to the pairs of pockets spaced between its ends. The ring 60' is so arranged that it is under initial tension when mounted upon the spokes after the fabric is impregnated and otherwise processed, whereby it is immune to any tendency to wrinkle, loosen or bulge at any point under the influence of centrifugal force of rotation or any other force during operation of the clutch. This method of making the strip for forming ring 60' is important, inasmuch as it results in the making of a smooth, strong joint in the ring without employing splicing, rivets, stitching or any other kind of fastening means, which are all objectionable in clutch rings because they provide non-uniform surfaces including different materials than the friction material, and are liable to injure the clutch as a whole by seizing the clutching surfaces and causing excessive wear thereof, and the like. This ring is formed by inserting the bifurcated spoke ends in the intermediate pockets of the strip while forming it into a ring around the spokes, and then inserting one of the tines 58 of the remaining spoke in one of the end pockets of the strip, whereby its ends are arranged in close abutment in the bifurcation of the spoke as shown in Fig. 8. In this way the ends of the strip are joined together to form the ring 60' without the need of the objectionable separate fastening means and operation.

Thus a smooth, substantially endless, and uniformly-surfaced ring is obtained without separate fastening means or operations and this ring may be readily dismounted from and remounted on the spokes without requiring the removal of rivets or other positive fastening means or special tools or special skill. The serrations in the times 58 of the forked spoke 57 catch in the sides of pockets 61 and prevent any tendency to displacement due to centrifugal force or shocks and strains. This flexible mounting also allows the ring 60' to be self-centering and conform to irregularities in the clutching surfaces as well as to compensate for and absorb vibration in the clutch. This arrangement is particularly valuable on clutches adapted for motors having excessive torsional vibration at critical speeds, whereby the resulting excessive wear on the friction ring is prevented, and the vibrations are stopped at the fly-wheel where they start before they are transmitted to the transmission element and the transmission driven thereby. This flexible friction ring and the flexible spider upon which it is mounted accordingly absorb and insulate the connection between the driving and driven mechanism against vibrations.

In operation, the release-collar 29 is advanced by the operator's pedal connected to release yoke 22, and levers 32 are pivoted about pins 33 so that ball 34 moves in a short arc about pin 33 and in such fashion so that the effective length of the short arm of the lever is decreased and the force applied thereby is correspondingly increased without requiring any increase in the force applied by the operator in manipulating the clutch pedal. As the lever 32 is manipulated, its ball 34 co-acting with the socket in slide 35, moves this slide along the slide plate 36, lifting the same and stud 37 with it to disengage presser plate 38 from transmission element 40, thereby disengaging the clutch. The metal from which the presser plate 38 is made is distributed in such a way as to prevent any warping tendency of the plate when it is subjected to high temperatures developed by friction under severe operating conditions. The various radial positions of the clutch springs 42 also prevent this warping and distortion of the presser plate and this spring arrangement may be used on the plain, unribbed type of presser plate with beneficial effects or may be combined with the ribbed presser plate in the manner described.

The transmission element 40 is arranged to absorb such vibrations as may be set up between the driven and driving elements of the clutch by flexure in all directions, the flexure in the plane of rotation being allowed by the spring bundles 50 and the flexure at an angle to the plane of rotation being allowed by the flexible spokes 57, washers 54, and friction ring 60 or 60', which also allow a slight turning of the flexible spokes. None of these vibration absorbing means detracts in any way from the positive driving power of the clutch, but enhances its operation by eliminating vibration set up by chattering, shocks or jars, and facilitates clutching and declutching.

I claim:

1. In a friction clutch, the combination of a driving element, a driven element, said elements being normally engaged, and means for causing engagement and disengagement of said elements including a presser plate, a lever fulcrumed at one of said elements adapted to move said plate and having a free end, a stud on said presser plate having a part extending substantially tangent to the arc of movement of the free end of said lever, and a slide connected to the free end of said lever and sliding on said stud part.

2. In a friction clutch, the combination of a driving element, a driven element, springs tending to force the driving and driven elements into driving engagement, and means for forcing said elements apart against the action of said springs, including levers pivotally mounted on one of said elements, each lever having arms arranged to give the lever increased effectiveness as the lever is rocked against increasing spring resistance, and means connected to the other of said elements and providing the operative connection between said levers and element, said means co-operating with said levers to effect slow relative movement of said elements as they approach engagement.

3. In a friction clutch, the combination of a driving element, a driven element, springs tending to force said elements into driving engagement, and means for disengaging said elements against the action of said springs including a lever pivotally mounted on one of said elements, said lever having arms disposed angularly to one another and arranged to give the lever increased effectiveness as the lever is rocked against increasing spring pressure, and a surface against which one end of said lever bears to perform its function, said surface being substantially tangent to the arc of movement of said end of the lever.

4. In a friction clutch, the combination of a driving element including a movable presser plate, a driven element, springs forcing the presser plate toward the driven element to effect a driving engagement between said elements, and means for releasing the spring pressure including a lever having its arms angularly disposed relative to one another and arranged to increase the effectiveness of the lever as the latter is rocked against increasing spring pressure, and a member secured to the presser plate and acted on by one arm of the lever, said member having a surface against which said arm bears, said surface being substantially tangent to the arc of movement of that portion of the arm which contacts with the surface.

5. In a friction clutch, the combination of a driving element including a movable presser plate, a driven element, springs forcing the presser plate toward the driven element to effect a driving engagement between said elements, and means for releasing the spring pressure including a lever having its arms angularly disposed relative to one another and arranged to increase the effectiveness of the lever as the latter is rocked against increasing spring pressure, and a member secured to the presser plate and acted on by one arm of the lever, said member having a substantially plane surface against which said arm bears, said surface being substantially tangent to the arc of movement of that portion of the arm which contacts with the surface.

6. In a friction clutch, the combination of a driving element and a driven element, springs tending to force said elements into driving engagement, and means for disengaging said elements against the action of said springs including a lever pivotally mounted on one of said elements, said lever having arms disposed angularly to one another and arranged to give the lever increased effectiveness as the lever is rocked against increasing spring pressure, and a member secured to one of said elements and having a surface against which one end of said lever bears in performing its function, said surface being substantially a plane which lies substantially tangent to the arc of movement of said end of the lever.

7. In a friction clutch, the combination of a driving element including a movable presser plate, a driven element, springs forcing the presser plate toward the driven element to effect a driving engagement between said elements, and means for forcing said elements apart against the action of said springs including a lever having arms angularly disposed relative to one another and arranged to increase the effectiveness of the lever as the latter is rocked against increasing spring pressure, a stud on said presser plate, and a member attached to said stud and having a surface against which one end of said lever acts, said surface being substantially tangent to the arc of movement of that portion of the lever which acts upon said surface, 8. In a friction clutch, the combination of a driving element including a movable presser plate, a driven element, springs forcing the presser plate toward the driven element to effect a driving engagement between said elements, and means for forcing said elements apart against the action of said springs including a lever having its arms disposed angularly relative to one another and arranged to increase the effectiveness of the lever as the latter is rocked against increasing spring pressure, a stud on the presser plate, and a plate attached to said stud at an angle to the direction of movement of said presser plate, and acted on by one end of said lever.

9. In a friction clutch, the combination of a driving element including a movable presser plate, a driven element, springs forcing the presser plate toward the driven element to effect a driving engagement between said elements, and means for forcing said elements apart against the action of said springs including a lever having its arms angularly disposed relative to one another and arranged to increase the effectiveness of the lever as the latter is rocked against increasing spring pressure, a stud attached to said presser plate, and a plate secured to said stud and having a surface acted on by one end of said lever, said surface lying substantially tangent to the arc of movement of said end of the lever.

10. In a friction clutch, the combination of a driving element including a movable presser plate, a driven element, springs forcing the presser plate toward the driven element to effect a driving engagement between said element, and means for forcing said element apart against the action of said spring including a lever having its arms angularly disposed relative to one another and arranged to increase the effectiveness of the lever as the latter is rocked against increasing spring pressure, and a plate secured to the presser plate and having a surface against which one end of the lever acts, said surface being inclined to the direction of presser plate movement.

11. In a friction clutch, the combination of a driving element including a movable presser plate, a driven element, springs forcing the presser plate toward the driven element to effect a driving engagement between said elements, and means for forcing said elements apart against the action of said springs including a lever having its arms angularly disposed relative to one another and arranged to increase the effectiveness of the lever as the latter is rocked against increasing spring pressure, a plate secured to the presser plate, a slide interposed between a portion of the plate and one end of the lever, the slide moving with the lever and as the lever is rocked, the movement of the slide being substantially rectilinear and inclined to the direction of presser plate movement during engagement and disengagement.

12. In a friction clutch, the combination of a driving element including a movable presser plate, a driven element, springs forcing the presser plate toward the driven element to effect a driving engagement between said elements, and means for forcing said elements apart against the action of said springs including a lever having its arms angularly disposed relative to one another and arranged to increase the effectiveness of the lever as the latter is rocked against increasing spring pressure, a member secured to the presser plate, and a slide interposed between the member and one end of the lever, the slide and member having a ball and socket connection.

13. In a friction clutch, the combination of a driving element including a movable presser plate, a driven element, springs forcing the presser plate toward the driven element to effect a driving engagement between said elements, and means for forcing said elements apart against the action of said springs including a lever mounted to pivot on an axis inclined to a radius of said presser plate at an angle less than a right angle, said lever having arms angularly disposed relative to one another and arranged to increase the effectiveness of the lever as the latter is rocked against increasing spring pressure.

14. In a friction clutch, the combination of a driving element including a movable presser plate, a driven element, springs forcing the presser plate toward the driven element to effect a driving engagement between said elements, and means for forcing said elements apart against the action of said springs including a plurality of levers pivotally mounted on one of said elements and having their pivot points in a common plane, and a member for each lever having a surface acted on by one end of said lever, the surfaces of said members lying inclined to said plane through said pivot points.

15. In a friction clutch, the combination of a driven element, a driving element, and a presser plate for effecting a driving connection between said elements, said presser plate having a flat working surface and having a plurality of ribs extending from its opposite surface, certain of said ribs being inclined to radii of said presser plate and others being concentric with said plate and others radial with respect to said plate.

ELMER V. J. TOWER.